No. 642,336. Patented Jan. 30, 1900.
A. JUNOD.
PNEUMATIC TIRE.
(Application filed Sept. 29, 1899.)
(No Model.)
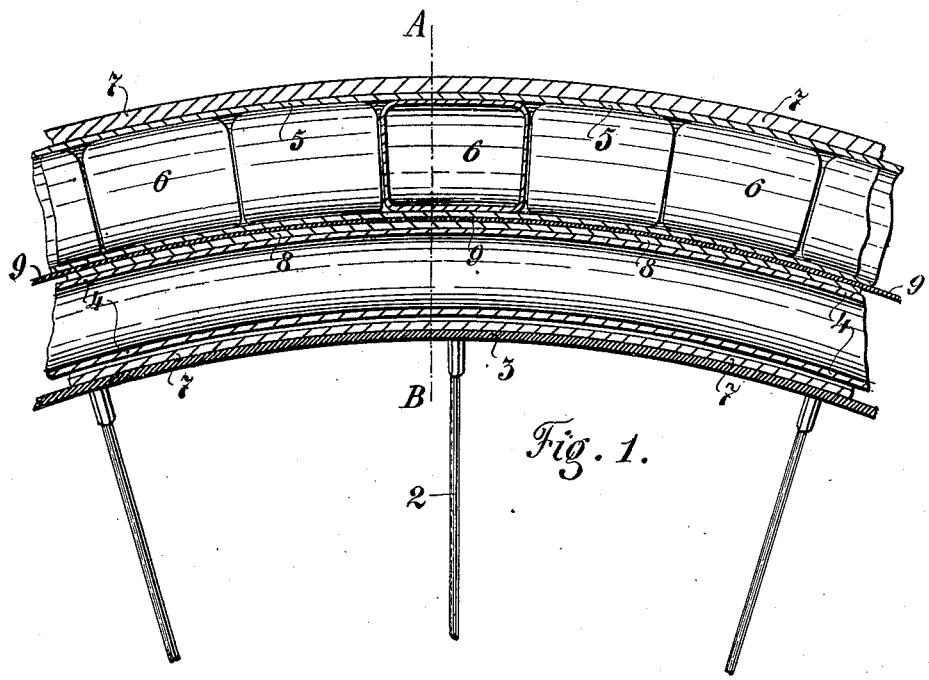
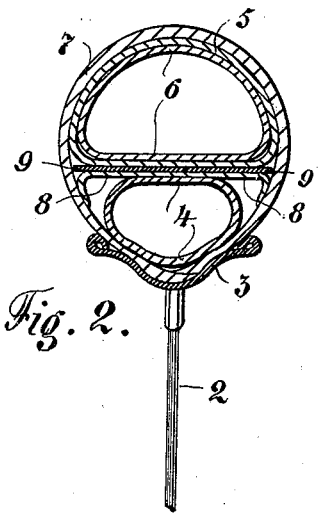
WITNESSES:
INVENTOR
Alfred Junod
BY
ATTORNEYS.
THE NORRIS PETERS CO., PHOTO-LITHO., WASHINGTON, D. C.

UNITED STATES PATENT OFFICE.

ALFRED JUNOD, OF STE. CROIX, SWITZERLAND.

PNEUMATIC TIRE.

SPECIFICATION forming part of Letters Patent No. 642,336, dated January 30, 1900.

Application filed September 29, 1899. Serial No. 732,103. (No model.)

*To all whom it may concern:*

Be it known that I, ALFRED JUNOD, merchant, a citizen of the Republic of Switzerland, residing at Ste. Croix, Switzerland, have invented a new and useful Improvement in and Relating to Pneumatic Tires, of which the following is a specification.

This invention relates to pneumatic tires for cycles or other vehicles; and the object of the invention is to provide a tire of durable construction and one which when punctured is not completely deflated thereby.

The invention consists of a pneumatic tire comprising a tire-cover, a membrane dividing said cover longitudinally into two compartments—one at the inner and the other at the outer side of the tire—inflated air-pockets in said outer compartment, a protective band interposed between said membrane and air-pockets, and an inflatable inner tube located in said inner compartment.

The invention consists, further, in the placing of said air-pockets in a sheath, the protective band being located between said sheath and the membrane.

In the accompanying drawings, Figure 1 is a longitudinal section of a portion of a pneumatic tire constructed according to my invention, and Fig. 2 is a vertical transverse section through the tire on the line A B of Fig. 1.

Similar characters of reference indicate corresponding parts.

Referring to the drawings, 2 indicates the spokes, and 3 the rim, of a wheel to which my improved tire is applied.

7 indicates the tire-cover or outer casing of the tire, and 8 is a membrane which extends through the tire longitudinally and is fixed at each side to the tire-cover, thereby dividing the tire into two longitudinal compartments. Within the outer compartment—*i. e.*, the compartment at the tread side of the tire— is arranged a number of air-pockets 6, which are inserted in an inflated condition. To facilitate handling these air-pockets or air-bulbs 6 in the course of manufacture of the tire, they are preferably inserted first into a tubular sheath 5 and the latter then placed in the tire-cover. Within the outer compartment is also located, between the air-pockets and the membrane or between the sheath and the membrane, if a sheath is used, a protective band 9 of steel, aluminium, celluloid, or other suitable material, the object of which is to prevent the passage into the inner compartment of a nail or other object which is puncturing the outer compartment. The inner compartment is located at the opposite side of the membrane and formed by the same and the tire-cover at the rim side of the tire. Within this air-tight compartment is located an inflatable continuous inner tube 4, which when inflated compresses the air within the inner compartment, thereby causing the membrane 8 to flatten out against the protective band, as shown in Fig. 2. The inner tube 4 contacts with the membrane and flattens out against the same when inflated, as shown clearly in this figure. As the air in the compartment is compressed outwardly at each side of the inner tube the tire-cover is drawn taut at each side, and no wabbling of the tire on the rim, which would otherwise occur, can take place.

My improved tire has the advantage that though the outer sheath and one of the air-pockets should be punctured the usefulness of the tire would not be destroyed, but, on the contrary, little affected. Liability of a serious puncture is reduced to a minimum, because the puncturing object will usually enter at the outer side of the protective band and will be stopped or deflected thereby.

Having thus described my invention, I claim as new and desire to secure by Letters Patent—

A pneumatic tire, consisting of a tire-cover, a membrane dividing said cover longitudinally into two compartments, one at the inner and the other at the outer side of the tire, inflated air-pockets in said outer compartment, a sheath surrounding said pockets, a protective band between said membrane and sheath, and an inner tube located in said inner compartment, substantially as set forth.

In testimony that I claim the foregoing as my invention I have signed my name in presence of two subscribing witnesses.

ALFRED JUNOD.

Witnesses:
  TH. IMER,
  L. H. DUFOUR.